Patented Oct. 14, 1952

2,614,104

UNITED STATES PATENT OFFICE 2,614,104

DERIVATIVES OF PARA-AMINO SALICYLIC ACID

Walter A. Winsten, Forest Hills, N. Y., assignor to Food Research Laboratories, Inc., Long Island City, N. Y., a corporation of New York No Drawing. Application May 26, 1950, Serial No. 164,599

1 Claim. (Cl. 260—240)

This invention relates to new and useful derivatives of para-amino salicylic acid hereinafter, for convenience, referred to as PAS.

PAS has the following structural formula:

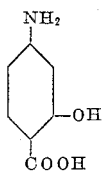

PAS has been used in the treatment of tuberculosis. However, the use of PAS in tuberculosis therapy is beset with difficulties. Thus it is generally given orally as free PAS or in the form of its sodium salt. It is necessary to administer large doses several times a day. In many cases the compound causes distress when taken orally.

The administration of large doses of PAS is necessary because of the fact that the compound is rapidly secreted through the kidneys. For this reason it is difficult to maintain steady blood levels, i. e., concentrations of the compound.

It has been proposed to administer PAS by injection in the form of compounds of PAS. Thus, a salt combination of streptomycin and PAS has been suggested for tuberculosis therapy. If PAS thus be intra-muscularly injected in the form of a suspension it is rapidly absorbed since it dissolves easily at the pH of the body.

I have discovered that a new derivative of PAS, the Shiff base formed between pyridoxal and PAS is rather sparingly and slowly soluble in water or in a 5% aqueous solution of sodium carbonate. PAS itself dissolved very rapidly in the bicarbonate solution.

The compound, pyridoxylidene-PAS is thus a useful depot form of the drug and can be injected intra-muscularly, giving rise to sustained PAS blood levels.

I form the pyridoxylidene-PAS by reacting pyridoxal and PAS either in water or in methanol solution thereof.

For example, using a methanol solution I have synthesized pyridoxylidene-PAS as follows:

203 mg. of pyridoxal hydrochloride were dissolved in 10 ml. of methanol. 209 mg. of the sodium salt of PAS (containing 16% moisture) was dissolved in 10 ml. of methanol.

The two solutions were then mixed. In a few minutes a deep orange precipitate formed. After cooling (in the ice box) the precipitate was filtered and washed with methanol; then with water to remove any salts; and then with methanol and ether. It was then dried for three hours at 37° C.

The reaction of the PAS with the pyridoxal may be represented as follows:

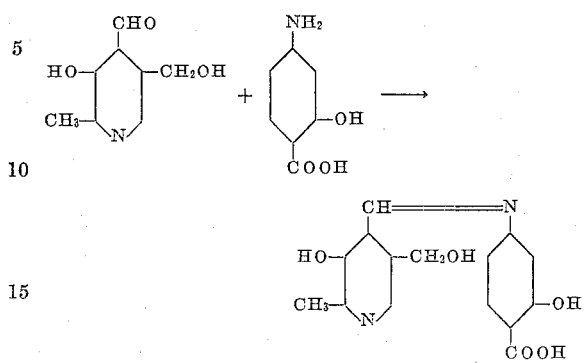

Analysis for $C_{15}H_{14}O_5N_2$

|  | Calculated | Found |
|---|---|---|
|  | Percent | Percent |
| Carbon | 59.60 | 59.40 |
| Hydrogen | 4.67 | 4.82 |
| Nitrogen | 9.27 | 9.06 |

I claim:

As a new composition of matter, pyridoxylidene para-amino salicylic acid having the formula:

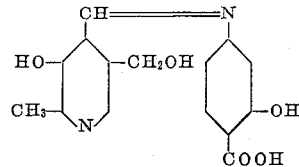

WALTER A. WINSTEN.

REFERENCES CITED

The following references are of record in the file of this patent:

UNITED STATES PATENTS

| Number | Name | Date |
|---|---|---|
| 2,540,946 | Hoffman | Feb. 6, 1951 |

OTHER REFERENCES

Heyl: J. Am. Chem. Soc., vol. 70, pp. 3669–3671 (1948); vol. 70, pp. 3429–3434 (1948); and vol. 70, p. 1670.